United States Patent [19]

Tung et al.

[11] Patent Number: 4,626,019

[45] Date of Patent: Dec. 2, 1986

[54] VEHICLE SUNSHADE STRUCTURAL ASSEMBLY

[75] Inventors: Randy W. Tung, Birmingham; Verner J. Fisher, Jr., Troy; William D. Wilstermann, Utica, all of Mich.; Brian K. Neale, Luton, England

[73] Assignee: General Motors Corporation, Detroit, Mich.

[21] Appl. No.: 801,581

[22] Filed: Nov. 25, 1985

[51] Int. Cl.⁴ .............................................. B60J 3/00
[52] U.S. Cl. ................................ 296/97 H; 296/97 K
[58] Field of Search .................. 296/97 H, 97 R, 97 K

[56] References Cited

U.S. PATENT DOCUMENTS

| | | | |
|---|---|---|---|
| 3,405,969 | 10/1968 | Creel | 296/97 H |
| 3,649,070 | 3/1972 | Hoyer | 296/97 H |
| 4,411,467 | 10/1983 | Cziptschirsch | 296/97 H |
| 4,435,009 | 3/1984 | Foggi | 296/97 H |
| 4,477,116 | 10/1984 | Viertel et al. | 296/97 H |

Primary Examiner—Robert R. Song
Attorney, Agent, or Firm—Patrick M. Griffin

[57] ABSTRACT

A two-piece structural assembly for a vehicle sunshade includes a lightweight laminate sunshade body with a low density central portion and an integral outer skin. The outer skin and central portion structurally cooperate to give sufficient rigidity that the sunshade body may be grasped to move the sunshade, but insufficient rigidity to allow it to be directly joined to the vehicle. A sunshade body support clampingly engages the sunshade body in such a way as to distribute the clamping force over the outer skin, allowing the sunshade body to be joined to the vehicle indirectly, while maintaining the structural integrity of the outer skin.

3 Claims, 3 Drawing Figures

VEHICLE SUNSHADE STRUCTURAL ASSEMBLY

This invention relates to vehicle sunshades generally, and specifically to a two-piece structural assembly for a vehicle sunshade.

BACKGROUND OF THE INVENTION

Vehicles generally include a sunshade that can be grasped and moved by a vehicle occupant up and down between an operative position that at least partially blocks the entrance of light, and an out of the way stowed position, generally against the vehicle headliner. As a minimum, a basic structural assembly for such a vehicle sunshade, excluding any decorative cover, must include a sunshade body capable of so blocking the light that can be movably joined to the vehicle by a suitable joining mechanism, such as a pivot assembly. It will be readily understood that such a sunshade body should be rigid enough to withstand the stress of being grasped and moved. The simplest structural assembly would be a one piece sunshade body of a uniform solid material, such as sheet plastic or rigid molded plastic, that was thick enough to be sufficiently rigid to be directly joined to the vehicle. Although simple, such a sunshade body would be undesirably heavy and expensive, and would not present a particularly comfortable feel to the occupant who grasped and moved it. A common solution to the drawbacks noted above is a sunshade structural assembly that incorporates plastic foam, which is lightweight, relatively inexpensive, and resilient enough to provide a comfortable feel when grasped. However, foam presents problems of its own. Foam is not inherently a particularly rigid or strong material. Therefore, sunshades incorporating it generally use it simply as a padding material, rather than structurally, providing the necessary strength and rigidity with other structure.

One common type of sunshade that incorporates foam has a generally flat, rigid central frame with foam padding placed on either side thereof. An example of this type may be seen in the U.S. Pat. No. 4,477,116 to Viertel et al. Another common type has a sunshade body with a central core of plastic foam reinforced by an internal peripheral frame of wire or other rigid material. An upper member of the inner frame is generally pivoted to the vehicle. Without the internal frame, the foam is insufficiently rigid to provide the sunshade body. A typical example of this type may be seen in the U.S. Pat. No. 4,411,467 to Cziptschirsch et al, and there are many other examples as well. A design that seeks to eliminate the internal reinforcing frame is disclosed in the U.S. Pat. No. 3,405,969 to Creel. This design uses an external frame that folds into two halves symmetrically about its lower edge. An optional central core of foam is placed between the halves, if desired, for padding only. Since the external frame must itself provide all the necessary rigidity for the sunshade body, it could not be made much thinner or lighter than a sunshade body made of a single plastic sheet or one with a molded frame. An external frame of such thickness would also negate much, if not most, of the padding potential of the foam.

SUMMARY OF THE INVENTION

The subject invention overcomes the shortcomings noted above by providing a two-piece structural assembly for a vehicle sunshade that does incorporate lightweight foam, but that is sufficiently rigid without the necessity of the reinforcing structures found in the prior art.

The first piece of the two-piece structural assembly is a sunshade body that includes a foamed low density central portion covered by an integral skin of higher density. The low density central portion is lightweight, but has little rigidity by itself. The higher density integral skin is sufficiently thick to cooperate with the central portion to give a unitary laminate structure that is just sufficiently rigid to withstand the stress of being grasped by a vehicle occupant to move the sunshade. However, the laminate structure is not sufficiently rigid to be itself directly joined to the vehicle. In the preferred embodiment disclosed, the unitary laminate structure is a thermoformed styrene melaic anhydride copolymer laminate. In addition, the sunshade body includes a retention portion with a plurality of grooves molded into the outer skin thereof during the thermoforming process.

The other piece of the structural assembly is a sunshade body support, which is a plastic extrusion in the preferred embodiment. The sunshade body support includes an attachment portion, which is a spine with a partially cylindrical passage therethrough. The attachment portion allows the sunshade to be joined to the vehicle by a cylindrical support rod so as to be movable between the stowed and operative positions. The sunshade body support also includes a pair of spaced retention members which are used to secure the sunshade body to the support to complete the structural assembly. In the preferred embodiment, the retention members are a pair of resilient legs that are spaced apart a distance less than the thickness of the retention portion of the sunshade body. The retention legs include ribs that are interfittingly engageable with the sunshade body retention portion grooves. The retention legs are therefore clampingly engageable over the outer skin of the sunshade body retention portion, with the grooves and ribs interfittingly engaged. The retention legs conform sufficiently closely to the outer skin of the retention portion to distribute their clamping force over the outer skin so that the structural integrity of the outer skin is maintained. The clamping force is sufficient to secure the sunshade body to the support to complete the assembly, and the sunshade may then be moved by grasping the sunshade body without damaging the outer skin where it is clampingly engaged. In addition, in the preferred embodiment, the interfitting grooves and ribs cooperate with the clamping force of the resilient legs to prevent the sunshade body retention portion from being withdrawn from between the retention legs.

It is, therefore, an object of the invention to provide a two-piece structural assembly for a vehicle sunshade of the type that is adapted to be joined to a vehicle for movement between a stowed and an operative position that has a sunshade body with a relatively low density central portion and an integral outer skin of higher density and sufficient thickness to cooperate with the central portion to form a unitary lightweight laminate structure of just sufficient rigidity to allow the sunshade to be moved between the stowed and operative positions by grasping the sunshade body, although not of sufficient rigidity to be directly attached to the vehicle, and a sunshade body support that has an attachment portion that is adapted to be movably joined to the vehicle to allow the sunshade to be moved between the stowed and operative positions after the sunshade body has been secured to the support, and that also has a pair of spaced retention members that are clampingly engageable over the outer skin of a portion of the sunshade body with sufficient clamping force to secure the sunshade body to the support, thereby completing the structural assembly, and in which the clamping engagement conforms sufficiently closely to and covers sufficient area of the outer skin of the sunshade body portion to distribute the clamping force over the outer skin to thereby maintain the structural integrity of the outer skin as the sunshade is grasped and moved.

It is another object of the invention to provide a sunshade structural assembly of the type described in which the retention members are a pair of resilient retention legs that are spaced apart less than the total thickness of a portion of the sunshade body so as to clampingly engage over the outer skin of that portion of the sunshade with sufficient clamping force to secure the sunshade body to the support to complete the structural assembly, with the resilient retention legs conforming sufficiently closely to and covering sufficient area of the outer skin of that portion of the sunshade body to distribute the clamping force over the outer skin to maintain the structural integrity of the outer skin.

It is yet another object of the invention to provide a sunshade structural assembly of the type described in which the sunshade body also includes a retention portion that has at least one groove molded into the outer skin thereof, and in which the resilient retention legs also include at least one rib that is interfittingly engageable with the sunshade body retention portion groove, whereby the retention legs may clampingly engage over the outer skin of the sunshade body retention portion with the retention portion groove and retention leg rib interfittingly engaged, so that the groove-rib interfitting engagement may cooperate with the clamping force of the retention legs to prevent the sunshade body retention portion from being withdrawn from between the retention legs to help secure the sunshade body to the support.

DESCRIPTION OF THE PREFERRED EMBODIMENT

These and other objects and features of the invention will appear from the following written description and the drawings in which.

Figure 1:
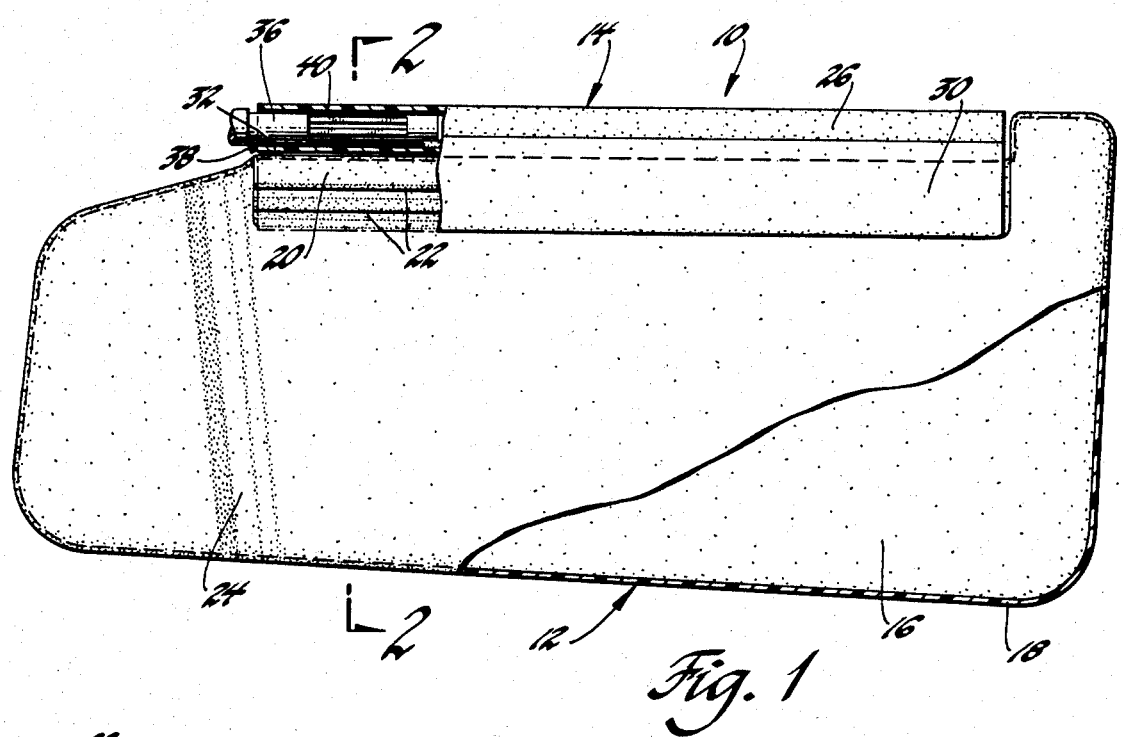
FIG. 1 is a view of the completed structural assembly of the invention, with a portion of the integral outer skin broken away from the sunshade body.
Figures 2, 3:
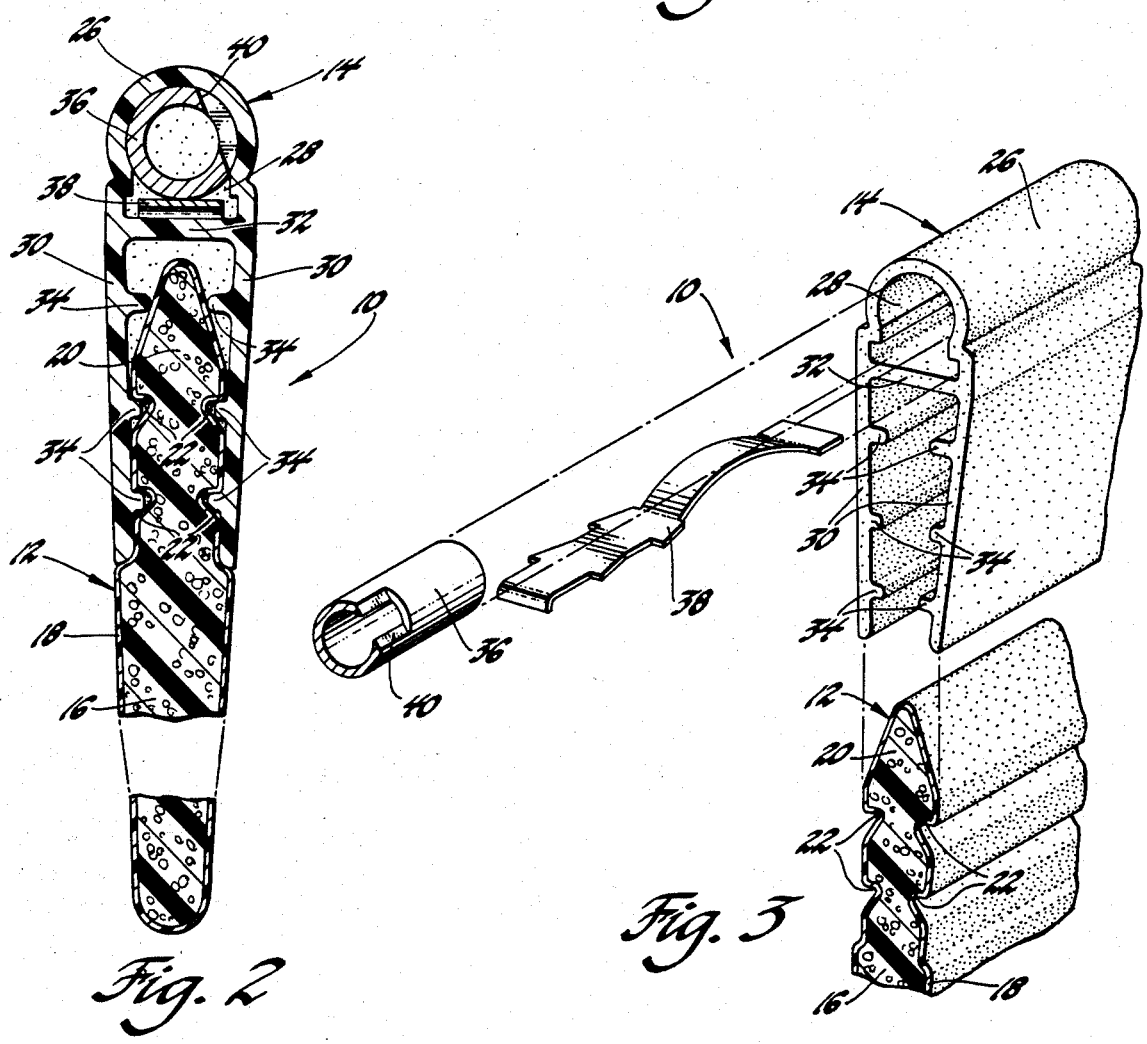
FIG. 2 is a sectional view taken along the line 2—2 of FIG 1.
FIG. 3 is an exploded perspective view of a portion of the invention.

Referring first to FIG. 1, the preferred embodiment of the two-piece vehicle sunshade structural assembly of the invention is designated generally at 10. The two pieces are a sunshade body designated generally at 12 and a sunshade body support designated generally at 14, which will be described in detail below. However, it should be kept in mind what is meant by "structural assembly" for a sunshade. The complete sunshade would, as a practical matter of esthetics, require some kind of decorative cover, which would be applied over the structural assembly disclosed here. Such a cover would not itself, however, have a structural function. Furthermore, some joining mechanism is required to movably join the structural assembly to the vehicle so that it can be moved between an operative down position, as seen in FIG. 1 or 2, and a flipped-up stowed position, not illustrated. This up and down movement would generally be done by the vehicle occupant grasping the sunshade body. Such a joining mechanism also need not be part of the basic sunshade structural assembly, but can be attached thereto separately. So, while that which comprises the invention would not be considered a complete sunshade as such, the structural assembly may be considered to move between operative and stowed positions just the same as the complete sunshade formed with it.

Referring next to FIGS. 1 and 2, sunshade body 12 is a unitary laminate structure which includes a lower density central portion 16 and an integral higher density outer skin 18. In the embodiment disclosed, both central portion 16 and outer skin 18 are formed from a styrene melaic anhydride copolymer. However, the outer skin 18, being denser, has a greater strength and toughness, although it obviously would weigh more, for an equivalent volume, than central portion 16. Sunshade body 12 may be manufactured starting with a blank of an initial laminate structure, not illustrated, that has a rigid central foam substrate of the styrene polymer to which a blowing agent, such as pentane, has been added. The central foam substrate is enclosed between outer film surfaces of the same material, but of higher density, which are approximately 10 thousandths of an inch thick. The blank is then placed in a mold with the desired final shape of sunshade body 12, and thermoformed in conventional fashion at a suitable temperature. The rigid central foam substrate expands significantly, some 300 percent in the embodiment disclosed, to form the low density, lightweight central portion 16. The film surfaces take on the shape of the inside of the mold and comprise the higher density integral outer skin 18. For the embodiment disclosed, sunshade body 12 also includes a reduced thickness retention portion 20, which tapers at the upper edge of sunshade body 12. Each side of the outer skin 18 of retention portion 20 has a pair of parallel grooves 22 molded thereinto during the thermoforming. The operation of retention portion 20 will be described in greater detail below, but its exact shape is not necessary to the practice of the invention in the broadest sense. Sunshade body 12 also has a reduced thickness live hinge 24 molded thereinto, which improves its conformation to the vehicle headliner, but it, too, is not strictly necessary.

Whatever shape is given to sunshade body 12, its most significant feature is that the central portion 16 and outer skin 18 structurally cooperate to give the unitary laminate structure described above. Outer skin 18 is integral with central portion 16, they are not a mere aggregation, such as a padding foam added to a rigid frame. That unitary laminate structure is lightweight, because of the low density central portion 16. But at the same time, outer skin 18 is sufficiently thick to give sufficient rigidity to sunshade body 12 that the completed sunshade may be moved between the stowed and operative positions by grasping sunshade body 12. However, outer skin 18 is not thick enough to give sunshade body 12 sufficient rigidity to be directly attached to the vehicle, nor is it intended to be. Were outer skin 18 made sufficiently thick that a joining mechanism, such as a pivot, could be attached directly to it, that would negate the weight advantage that the invention achieves. Sunshade body support 14, described next, cooperates with sunshade body 12 to give a structural assembly 10 that can be movably joined to the vehicle.

Referring next to FIGS. 1 through 3, sunshade body support 14 is extruded from a suitable plastic, nylon here, and consequently has a constant cross-section, as seen in FIG. 2. Sunshade body support 14 includes an attachment portion by which it, and therefore the completed structural assembly 10, are movably joined to the vehicle. For the embodiment disclosed, that attachment portion is a spine 26 extending along the entire length of support 14, with a partially cylindrical passage 28 therethrough. Extending generally perpendicularly from spine 26 are a pair of retention members, resilient retention legs 30 in the embodiment disclosed. A continuous wall 32 beneath passage 28 bridges retention legs 30. Retention legs 30, in their free state seen in FIG. 3, converge toward each other, and are spaced apart less than the thickness of sunshade body retention portion 20. Integral with the inside of each retention leg 30 are three parallel ribs 34, the lowermost two of each three being sized so as to be interfittingly engageable with the retention portion grooves 22.

The structural cooperation between sunshade body 12 and sunshade body support 14 and the actual completion of structural assembly 10 will be described below. First, however, the joining mechanism used to movably join the completed structural assembly 10 to the vehicle will be described. Referring to FIGS. 2 and 3, a hollow cylindrical support rod 36 fits closely, but turnably, within partially cylindrical passage 28. Rod 36 is in turn fixed to the vehicle by conventional means not illustrated. Sunshade body support 14 may therefore pivotally move up and down on support rod 36. It will be easily understood, therefore, that the completed structural assembly 10, and the sunshade formed from it, can likewise pivotally move up and down on rod 36, between the operative position of FIG. 2 and the flipped up stowed position, not illustrated. A spring clip 38 press fits into passage 28, resting on wall 32. Spring clip 38 is pressed down toward wall 32 by the surface of rod 36 when the structural assembly 10 is in the operative position. As structural assembly 10 is flipped up, spring clip 38 expands into a notch 40 cut into the surface of support rod 36 to maintain structural assembly 10 in the stowed position. A different joining mechanism, such as a pivot mechanism fixed to just one end of support 14, could be used. However, the cooperating partially cylindrical passage 28, wall 32 spring clip 38 and support rod 36 are particularly well suited to a support 14 that is formed by an extrusion process.

Still referring to FIGS. 2 and 3, sunshade body 12 is secured to support 14 to complete the structural assembly 10 by inserting retention portion 20 between retention legs 30. This is done simply by a push fit, with the retention portion 20 biasing the retention legs farther apart and the ribs 34 ratcheting past and through the grooves 22. When retention portion 20 has been inserted as far as possible, the lowermost two ribs 34 and the grooves 22 are interfittingly engaged, and the uppermost ribs 34 are biased against the tapered edge of retention portion 20 for centering and stability. Since retention portion 20 is reduced in thickness, retention legs 30 are essentially flush with the outer skin 18 of the rest of sunshade body 12. The relative thickness of retention portion 20 and the spacing of retention legs 30 assure that retention legs 30 clampingly engage retention portion 20, thereby providing a clamping force to secure sunshade body 12 to support 14 to complete structural assembly 10. The rib 34 and groove 32 interengagement also cooperates with that clamping engagement to help prevent retention portion 20 from being withdrawn from between retention legs 30. Retention legs 30 conform sufficiently closely to the outer skin 18 of retention portion 20, and cover sufficient area thereof, to distribute their clamping force over outer skin 18. The movement of completed structural assembly 10 on rod 36 has been described above. The distribution of the clamping force maintains the structural integrity of the outer skin 18 of retention portion 20, preventing it from rupturing when sunshade body 12 is grasped to move structural assembly 10.

Variations of the preferred embodiment disclosed may be made within the spirit of the invention. Instead of the ribs 34 and grooves 22, smooth surfaced retention members could be designed to clampingly engage a smooth surfaced retention portion of sunshade body 12 with sufficient clamping force. For example, a retention portion with a dove tail shaped cross section could slide with a frictional fit between retention members that defined a similar shaped space therebetween. The interfitting dove tail shapes would prevent withdrawal or separation. The retention members in such a case would not necessarily need to be resilient, as there is a certain amount of inherent resilience in the laminate structure that makes up sunshade body 12. Or, more resilience could be built into the retention members and the outer skin 18 of a retention portion with parallel sides made thick enough to withstand a greater clamping force. Then, just the tension of the retention members engaged over the retention portion would secure sunshade body 12 to support 14. Furthermore, while outer skin 18 is made durable enough to withstand the ratcheting action of retention portion 20 being push fit between the ribbed retention legs 30, they could be pried apart first before inserting retention portion 20 therebetween, thereby avoiding the stress of the ratcheting action. Therefore, it will be understood that the invention is not intended to be limited to the preferred embodiment disclosed.

The embodiments of the invention in which an exclusive property or privilege is claimed are defined as follows:

1. A two-piece structural assembly for a vehicle sunshade of the type that is adapted to be joined to a vehicle for movement between a stowed and an operative position, comprising, a sunshade body including a relatively low density central portion and an integral outer skin of higher density and sufficient thickness to form in cooperation with said central portion a unitary lightweight laminate structure of just sufficient rigidity to allow said sunshade to be moved between said stowed and operative positions by grasping said sunshade body, but of insufficient rigidity to allow said sunshade body to be directly attached to said vehicle, a sunshade body support having an attachment portion that is adapted to be movably joined to said vehicle so as to allow said sunshade to be so moved between said stowed and operative positions when said sunshade body has been secured to said support, said support also having a pair of spaced retention members that are clampingly engageable over the outer skin of a portion of said sunshade body with sufficient clamping force to so secure said sunshade body to said support to complete said structural assembly, said retention members conforming sufficiently closely to and covering sufficient area of said outer skin of said insufficiently rigid sunshade body portion to distribute said clamping force over said outer skin so as to maintain the structural integrity of said outer skin as said sunshade is so moved between said stowed and operative positions by grasping said sunshade body.

2. A two-piece structural assembly for a vehicle sunshade of the type that is adapted to be joined to a vehicle for movement between a stowed and an operative position, comprising, a sunshade body including a relatively low density central portion and an integral outer skin of higher density and sufficient thickness to form in cooperation with said central portion a unitary lightweight laminate structure of just sufficient rigidity to allow said sunshade to be moved between said stowed and operative positions by grasping said sunshade body, but of insufficient rigidity to allow said sunshade body to be directly attached to said vehicle, a sunshade body support having an attachment portion that is adapted to be movably joined to said vehicle so as to allow said sunshade to be so moved between said stowed and operative positions when said sunshade body has been secured to said support, said support also having a pair of resilient retention legs that are spaced apart less than the thickness of a portion of said sunshade body so as to clampingly engage over the outer skin of said sunshade body portion with sufficient clamping force to so secure said sunshade body to said support to complete said structural assembly, said resilient retention legs conforming sufficiently closely to and covering sufficient area of said outer skin of said insufficiently rigid sunshade body portion to distribute said clamping force over said outer skin so as to maintain the structural integrity of said outer skin as said sunshade is so moved between said stowed and operative positions by grasping said sunshade body.

3. A two-piece structural assembly for a vehicle sunshade of the type that is adapted to be joined to a vehicle for movement between a stowed and an operative position, comprising, a sunshade body including a relatively low density central portion and an integral outer skin of higher density and sufficient thickness to form in cooperation with said central portion a unitary lightweight laminate structure of just sufficient rigidity to allow said sunshade to be moved between said stowed and operative positions by grasping said sunshade body, but of insufficient rigidity to allow said sunshade body to be directly attached to said vehicle, said sunshade body further including a retention portion having at least one groove molded into the outer skin thereof, a sunshade body support having an attachment portion that is adapted to be movably joined to said vehicle so as to allow said sunshade to be so moved between said stowed and operative positions when said sunshade body has been secured to said support, said support also having a pair of resilient retention legs that are spaced apart less than the thickness of said sunshade body retention portion, at least one of said retention legs further including a rib that is interfittingly engageable with said sunshade body retention portion groove, whereby said retention legs may clampingly engage over the outer skin of said sunshade body retention portion with said retention portion groove and retention leg rib interfittingly engaged, said clamping engagement providing sufficient clamping force in cooperation with said groove-rib interfitting engagement to prevent said sunshade body retention portion from being withdrawn from between said retention legs, thereby securing said sunshade body to said support to complete said structural assembly, said resilient retention legs conforming sufficiently closely to and covering sufficient area of said outer skin of said insufficiently rigid sunshade body retention portion to distribute said clamping force over said outer skin so as to maintain the structural integrity of said outer skin as said sunshade is so moved between said stowed and operative positions by grasping said sunshade body.

* * * * *